(12) United States Patent
Shum

(10) Patent No.: US 9,953,360 B2
(45) Date of Patent: Apr. 24, 2018

(54) SALE OF FOOTWEAR BY SUBSCRIPTION

(71) Applicant: NIKE, Inc., Beaverton, OR (US)

(72) Inventor: Albert Shum, Portland, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

(21) Appl. No.: 14/047,540

(22) Filed: Oct. 7, 2013

(65) Prior Publication Data

US 2014/0040076 A1   Feb. 6, 2014

Related U.S. Application Data

(63) Continuation of application No. 11/012,086, filed on Dec. 13, 2004, now Pat. No. 8,554,691.

(51) Int. Cl.
  *G06Q 10/00* (2012.01)
  *G06Q 30/06* (2012.01)
  *G06Q 99/00* (2006.01)

(52) U.S. Cl.
  CPC ..... *G06Q 30/0635* (2013.01); *G06Q 30/0603* (2013.01); *G06Q 99/00* (2013.01)

(58) Field of Classification Search
  CPC .............................. G06Q 10/00; G06Q 30/02
  USPC ................ 705/7.11–7.42, 302–307, 342–347
  See application file for complete search history.

(56) References Cited

U.S. PATENT DOCUMENTS

| | | | |
|---|---|---|---|
| 5,206,804 A | | 4/1993 | Thies et al. |
| 5,471,405 A | * | 11/1995 | Marsh .............................. 702/41 |
| 5,825,327 A | * | 10/1998 | Krasner ................... 342/357.57 |
| 5,894,682 A | * | 4/1999 | Broz ................................. 36/31 |
| 7,308,410 B2 | * | 12/2007 | Bowe et al. ................... 705/302 |
| 2001/0049890 A1 | | 12/2001 | Hirsch et al. |
| 2002/0065825 A1 | | 5/2002 | Kassan et al. |
| 2003/0033207 A1 | * | 2/2003 | Litke et al. ..................... 705/26 |
| 2003/0110095 A1 | | 6/2003 | Danenberg |
| 2003/0132298 A1 | | 7/2003 | Swartz et al. |

\* cited by examiner

*Primary Examiner* — Robert D Rines
(74) *Attorney, Agent, or Firm* — Banner & Witcoff, Ltd.

(57) ABSTRACT

A user enters into a subscription to receive footwear having one or more specified performance characteristics. As the user finishes wearing one set of footwear, the user can obtain a replacement set of footwear that also will have one or more specified performance characteristics. The performance characteristics may be consistent for each set of footwear provided according to the subscription. Alternately, the footwear performance characteristics may vary over the life of the subscription. Thus, the footwear provider may periodically obtain biometric information describing the user's athletic activities or performance. The footwear provider then can tailor the performance characteristics of footwear provided under the subscription to match the user's athletic activities or performance.

12 Claims, 5 Drawing Sheets

SALE OF FOOTWEAR BY SUBSCRIPTION

CROSS REFERENCE TO RELATED APPLICATIONS

This application is a continuation of U.S. patent application Ser. No. 11/012,086 filed Dec. 13, 2004, entitled "Sale of Footwear by Subscription," which is incorporated herein by reference in its entirety.

FIELD OF THE INVENTION

The present invention relates to the distribution or purveyance of footwear. Various aspects of the present invention are particularly applicable to distributing or purveying footwear to users on a subscription basis.

BACKGROUND OF THE INVENTION

Athletic footwear has become a multi-billion dollar industry. Footwear manufacturers now offer a wide variety of footwear with different shapes, ornamentation, and performance characteristics. While this wide range of choices is beneficial to a number of consumers, it can be inconvenient to running enthusiasts or other dedicated athletes. Even many amateur dedicated athletes, for example, often will require that his or her footwear have a particular set of performance characteristics. Thus, a dedicated runner may prefer footwear with a particular degree of cushioning, a particular amount of lateral stability, and with a particular width in the toe box of the footwear.

A large selection of athletic footwear offered by a manufacturer typically will contain a footwear model with an athlete's desired performance characteristics. The athlete may have difficulty, however, in identifying the particular model of footwear with those desired performance characteristics from among the large selection of available footwear. Moreover, even if the athlete can identify a footwear model having the desired performance characteristics, there is no guarantee that subsequent versions of that footwear model will share those performance characteristics. Footwear manufacturers often vary both the outward appearance of a footwear model and the performance characteristics of the footwear model on a seasonal basis. Accordingly, consistently obtaining footwear having desired performance characteristics often is a tedious irritation for dedicated athletes.

BRIEF SUMMARY OF THE INVENTION

Advantageously, various implementations of the invention provide techniques whereby a user can consistently obtain footwear with the performance characteristics desired for the user. With these techniques, a user enters into a subscription to receive footwear having desired performance characteristics. One or more of these performance characteristics may be specified in advance of the subscription. Alternately or additionally, one or more of these performance characteristics may be modified over the duration of the subscription. In some instances, one or more of the performance characteristics may be selected by the user. Alternately or additionally, one or more of the performance characteristics may be selected by another person, such as a coach or footwear consultant. Moreover, one or more of the performance characteristics may be specified based upon measurements of the user's athletic performance, measurements of the user's foot activity when performing an athletic activity, or both.

When the user has concluded using one set of footwear with the specified performance characteristics, the user can order a replacement set of footwear according to the subscription. The replacement footwear then will have either the original or, in same instances, new specified performance characteristics. A variety of payment techniques can be used with various implementations of the subscription. For example, a user may make a single payment on the subscription, and in return periodically receive footwear having specified performance characteristics. In implantations, the payment for the subscription may vary based upon the user's use of the footwear. For example, if the user travels a preset distance with the footwear or participates in authorized athletic activities, the user may received a discount for the cost of the subscription.

DETAILED DESCRIPTION OF THE INVENTION

Overview

Figure 1:
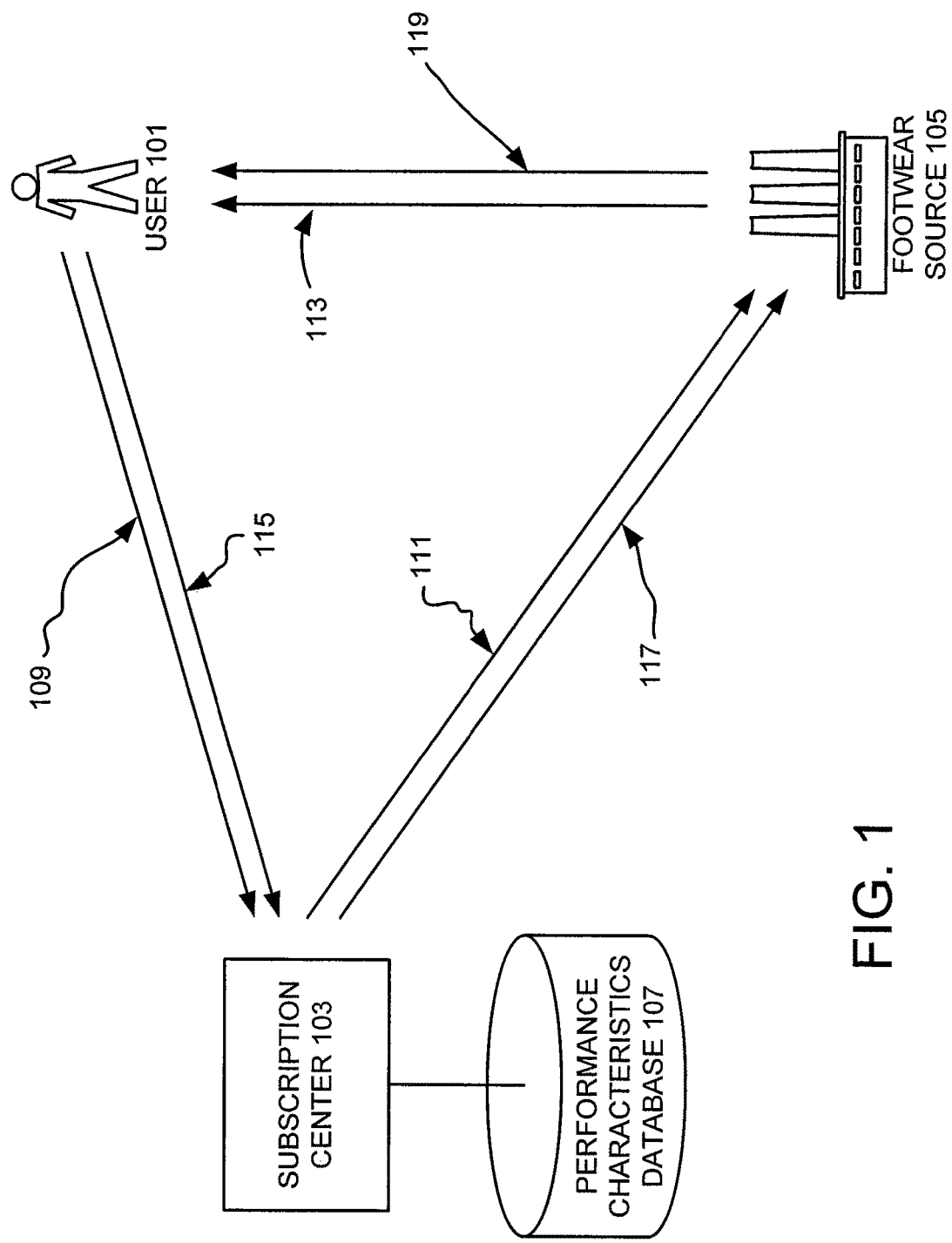
FIG. 1 shows a system for purveying footwear to a user according to various embodiments of the invention.

Various embodiments of the invention allow a user to conveniently and regularly obtain footwear having performance characteristics desired for the user. With different embodiments of the invention, a user enters into a subscription to receive footwear having one or more specified performance characteristics. As the user finishes wearing one set of footwear, the user can obtain a replacement set of footwear that also will have one or more specified performance characteristics. For some embodiments of the invention, the performance characteristics may be consistent for each set of footwear provided according to the subscription. With still other embodiments of the invention, the footwear performance characteristics may vary over the life of the subscription. For example, the footwear provider may periodically obtain biometric information describing the user's athletic activities or performance. The footwear provider then can tailor the performance characteristics of footwear provided under the subscription to match the user's athletic activities or performance.

A variety of different payment methods can be employed according to different embodiments of the invention. For example, with some embodiments of the invention, a user may prepay an entire amount for a subscription. Alternately, the user may pay a portion of the subscription amount in advance, and then pay a fixed or adjustable amount during the life of the subscription. With still other embodiments, a user may forego an advance payment, and only pay during the life of the subscription. For payments made during the life of the subscription, the payments may be made on a scheduled basis, in association with the user obtaining a new set of footwear, or some combination of both.

Still other embodiments of the invention may provide the user with a partial or complete discount for participating in or performing another activity. For example, a user may receive a footwear subscription while the user is a member of an athletic club, a sports team, or employed by a company or other organization. Alternately or additionally, a user may receive a partial or complete discount on a footwear subscription for traveling a preset distance over the life of the footwear, using the footwear to participate in a specific athletic competition or events (such as a footrace or golf tournament), or using the footwear to participate in a preset number of athletic competitions or events.

Moreover, the amount of the discount may depend upon the amount of use for provided footwear. For example, if a user travels a first distance in provided footwear, the user may receive a first discount (e.g., a 10% discount) on the cost of replacement footwear under the subscription. If, however, the user travels a second, longer distance in provided footwear, then the user may receive a second, larger discount (e.g., a 15% discount) on replacement footwear. Similarly, a user may receive a discount under the subscription for participating in more (or more significant or challenging) athletic competitions or events.

According to different embodiments of the invention, a user may obtain a new set of footwear under the subscription according to a variety of techniques. With some embodiments of the invention, for example, the user may obtain a new set of footwear by returning a previously obtained set of footwear. Some of these embodiments of the invention may additionally require a user to generate a preset amount of wear for a set of footwear before receiving a new set of footwear. With still other embodiments, however, a user may automatically obtain a new set of footwear according to a previously-determined schedule.

Footwear Purveying System

Figure 2A:
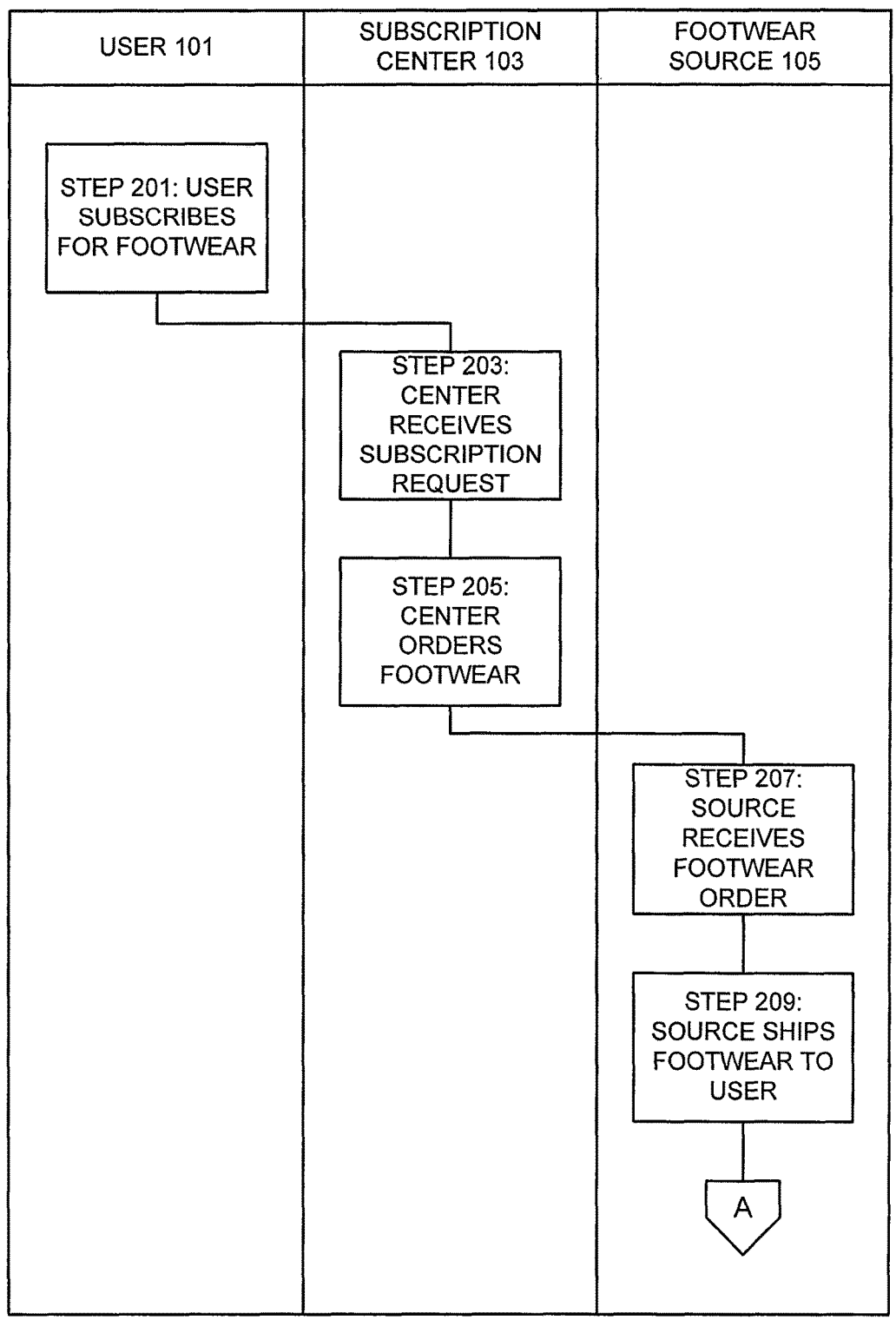
FIGS. 2A-2C show a flowchart illustrating a method of purveying footwear to a user according to various embodiments of the invention.
Figure 2B:
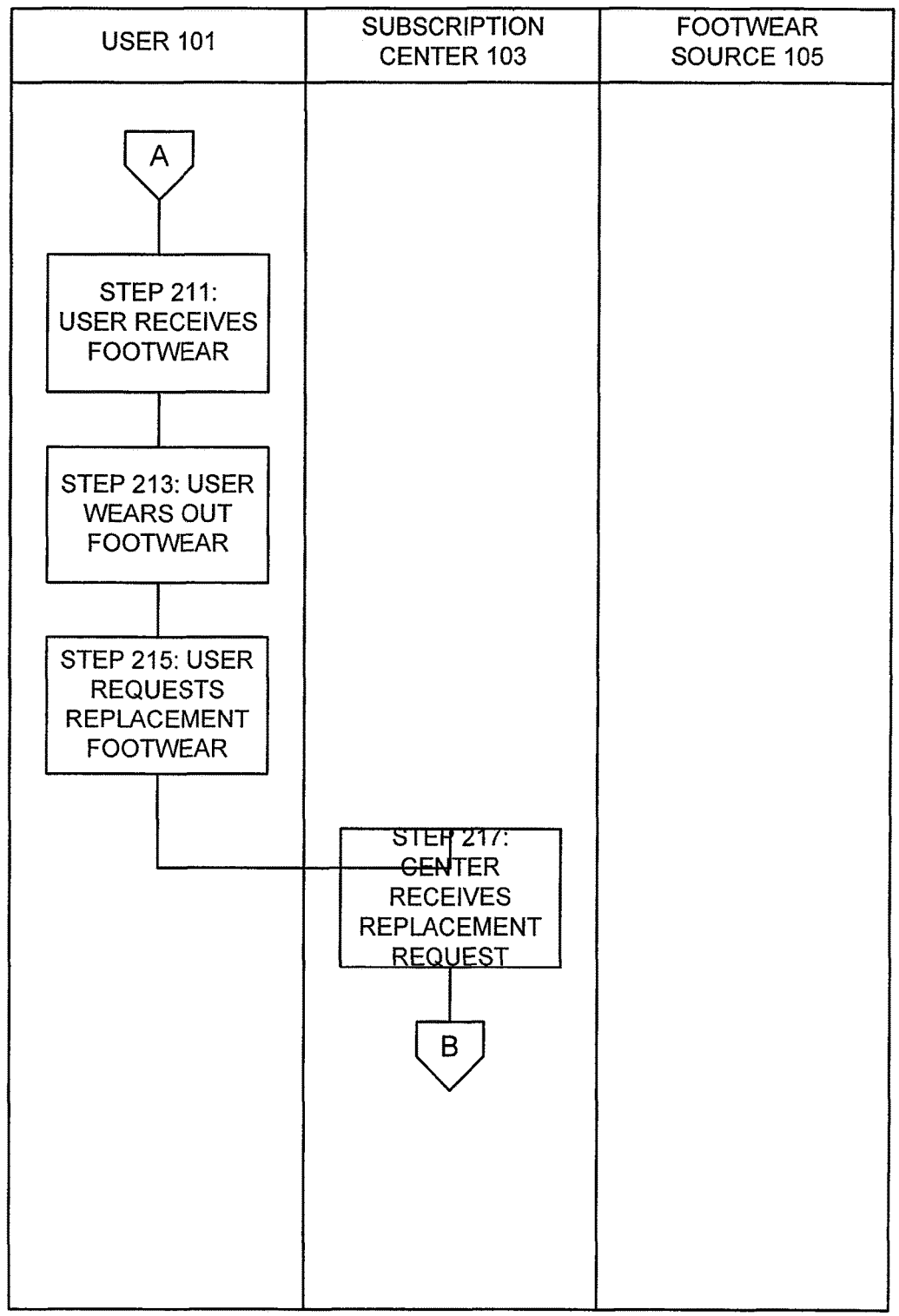
Figure 2C:
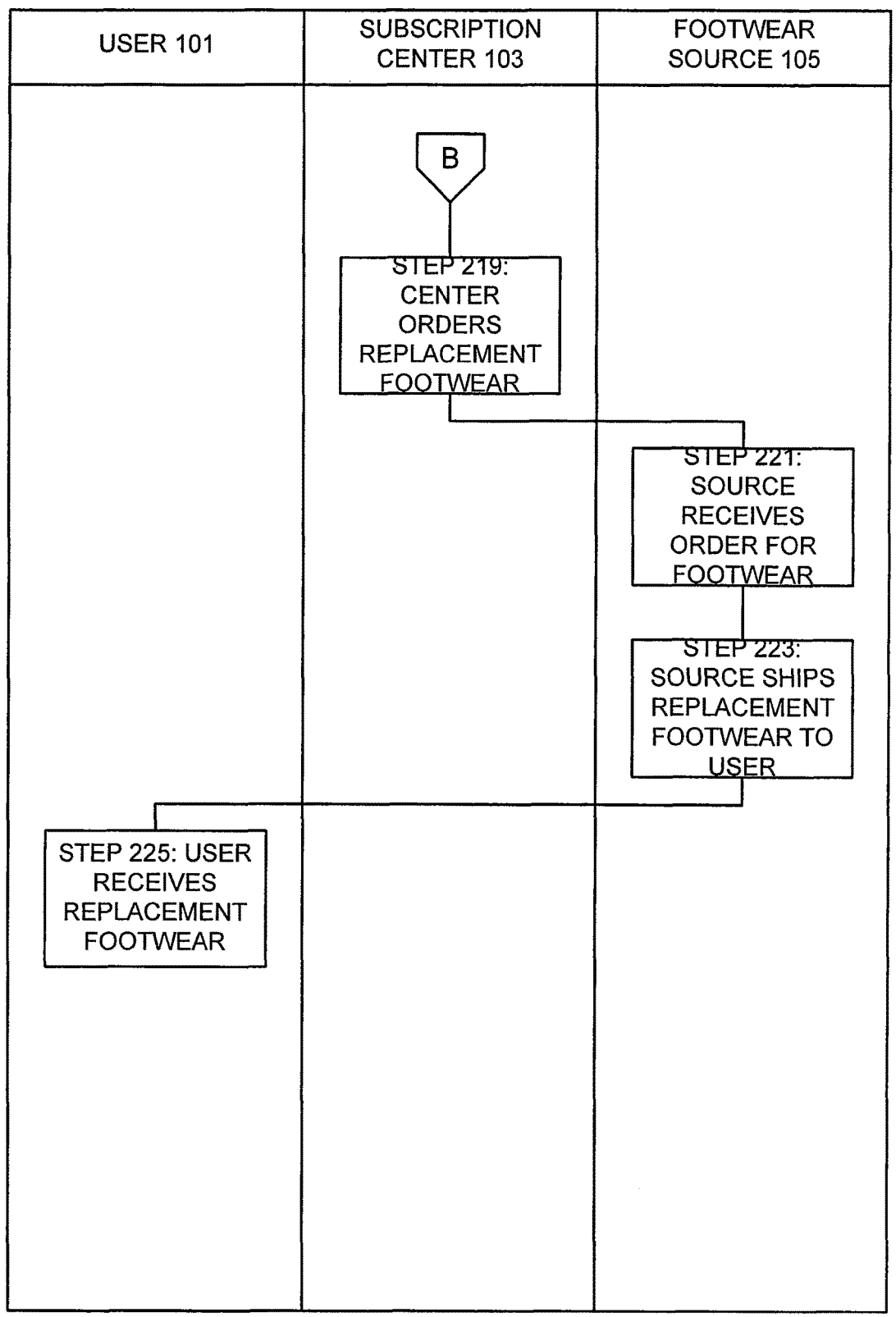

FIG. 1 shows a system for purveying footwear to a user according to various embodiments of the invention. As seen in this figure, a user 101 interacts with the subscription system, which includes a subscription center 103 and a footwear source 105. The system may optionally include a performance characteristics database 107, in communication with the subscription center 103. The operation of this system will be described with reference to FIGS. 2A-2C.

A subscription process begins when a user 101 submits a subscription request 109 to the subscription center 103. The subscription center 103 may be a physical location, such as a footwear retail store or footwear manufacturing facility located in a building available to the public. Alternately, the subscription center 103 may be a virtual location, such as a configuration of one or more markup language pages (e.g., HTML pages) provided on one or more server computers in a computer network (sometimes referred to as a "Web site").

The subscription request 109, or information associated with the subscription request 109, will typically include identification and delivery information for the user 101. For example, the subscription request 109 may include the name and residence of a user 101. With various embodiments of the invention, the subscription request 109 will also include (or be otherwise associated with) subscription payment information. According to various different embodiments of the invention, the subscription payment may be in any suitable form. For example, the initial subscription payment may be by cash, credit, debit to an existing bank account, wire transfer, or through the use of a virtual or electronic money payment service, such as the PAYPAL payment service available from eBay, Inc., in San Jose, Calif. Accordingly, the subscription request 109 may additionally include, for example, billing information indicating how the user 101 should be billed for the payment, information necessary to effect the payment, the user's billing address and similar .

Still further, the subscription request 109 will include or otherwise be associated with one more specified performance characteristics for footwear. Thus, a subscription request 109 will correspond with specified footwear performance characteristics. These characteristics may be any desired characteristics that relate to the performance of the footwear in allowing the user 101 to walk, run, or perform some other physical activity. Conventional performance characteristics for footwear may specify any combination of parameters including, for example, traction, flexibility, stability, cushioning, and fit. Moreover, the subscription request 109 may specify a single value for one or more performance characteristics, or a range of values for one or more performance characteristics. Thus, the performance characteristics may define a specific cushioning value or range of values, a specific stability value or range of values, a specific size value (such as a width or length) or range of values, or a specific flexibility value or range of values. Moreover, the performance characteristics may define one or more of these a values for a particular portion of the footwear (e.g., a specific width for the toe box of the footwear). As will be appreciated by those of ordinary skill in the art, the performance characteristics of a set of footwear will be distinguishable from the cosmetic or ornamental characteristics of the footwear.

With some embodiments of the invention, the subscription request 109 will expressly specify the footwear performance characteristics. With other embodiments of the invention, however, the subscription request 109 may inherently specify the footwear performance characteristics. For example, rather than specifying a particular width and cushioning value, the subscription request 109 may instead specify a particular footwear model desired by the user 101. With these embodiments, the subscription center 103 will be able to identify the performance characteristics associated with the specified footwear model. For example, the subscription center 103 may have access to the records of the footwear manufacturer that manufactured the specified footwear model.

Still further, with various embodiments of the invention, the subscription center 103 may select a particular model of footwear possessing performance characteristics performance characteristics desired by the user based upon information provided by or otherwise obtained from the user. For example, the user may provide a history or other record of his or her athletic performance or activities. Also, various aspects of the user's performance or activities may be measured for the subscription center 103. Based upon this information, the subscription center 103 may determine one or more appropriate performance characteristics for the footwear requested in subscription request 109.

In step 203, the subscription center 103 receives in the subscription request 109 from the user 101. In response, the subscription center 103 saves the specified footwear performance characteristics for future use. More particularly, the subscription center 103 records the specified performance characteristics in such a way that they are associated with the subscription request 109, the user 101, or both. With various embodiments of the invention, the performance characteristics may be stored in a performance characteristics database 107. The database record for the performance characteristics may then also include an identifier identifying the subscription request 109, an identifier identifying the user 101, or both.

Next, in step 205, the subscription center 103 submits an order 111 for footwear with the specified performance characteristics to the footwear source 105. According to different embodiments of the invention, the order 111 may relay the specified performance characteristics in a variety of forms. For example, if the original subscription request 109 specified a particular model of footwear, then the order 111 may likewise simply specify that model of footwear. Alternately, if the original subscription request 109 expressly listed the specified performance characteristics, then the order 111 may simply relay those specified characteristics. If the subscription request 109 included a history of the user's athletic performance or activities, or measurements of aspects of the user's athletic performance or activities, this information also simply may be relayed to the footwear source 105. With these embodiments, the footwear source 105 may then choose a particular model of footwear possessing the specified performance characteristics based upon the information provided in the order 111.

With various embodiments of the invention, the order 111 also will include the shipping information for the user 101 provided in the original subscription request 109. In response to receiving the order 111, in step 209 the footwear source 105 ships the specified footwear 113 (or footwear with the specified performance characteristics) to the user 101. In step 211, the user 101 receives the footwear 113 from the footwear source 105. Upon receiving the footwear 113, the user 101 can employ the footwear 113 as desired. When the footwear 113 finally wears out or is otherwise no longer suitable for its desired purpose, the user 101 submits a replacement request 115 for replacement footwear to the subscription center 103 in step 215. Advantageously, the replacement request 115 allows the user 101 to ensure that the replacement footwear also possesses the specified performance characteristics.

For example, with some embodiments of the invention, the replacement request 115 may be automatically generated (using, e.g., a computer tool or software application provided by the subscription center 103) to include the specified performance characteristics submitted in the original subscription request 109. Alternately or additionally, the replacement request 115 may simply reference the identity of the user 101, an identifier corresponding to the original subscription request 109, or both. Using this identification information, the subscription center 103 can then identify the specified performance characteristics corresponding to the original subscription request 109 (or to the user 101).

With some embodiments of the invention, the subscription center 103 may require some evidence that the previously provided set of footwear has become worn out or is no longer usable. For example, the subscription center 103 may require that the user 101 include the previously provided set of footwear with the replacement request 115. Alternately, the subscription center 103 may require that the user 101 include a portion of the previously provided set of footwear (e.g., the tongues of from of the footwear) with the replacement request 115.

With some embodiments of the invention, the previous provided set of footwear (and, of course, footwear subsequently obtained through the subscription) itself may provide an indication that the footwear should be replaced. For example, with some embodiments of the invention, the footwear may include an electronic light or other indicator. This indicator then may be directly or indirectly connected to an instrument for measuring the amount of use for the footwear, such as a pedometer, a global positioning device, a local positioning device, an accelerometer, or pressure switch. After the instrument has recorded a preset amount of use of the footwear, the instrument may then activate the indicator, thereby alerting the user to replace the footwear with new footwear under the subscription.

For example, some embodiments of the invention may employ a pedometer to measure the distance traveled by footwear. When the user has employed the footwear to travel, e.g., 500 miles, the pedometer may cause the indicator to light, or to change colors (e.g., from green to yellow). As the user continues to travel with the footwear beyond a distance of 500 miles, the pedometer may cause the indicator light to change again. For example, the pedometer may cause the indicator light to begin flashing, or to change colors yet again (e.g., from yellow to red), thereby indicating that the footwear should be replaced. Of course, any manner of visual, sonic or tactile indication may be employed to indicate wear according to different embodiments of the invention.

It should be noted that, with some embodiments of the invention employing an instrument for measuring an amount of use for the footwear, the footwear also may employ fraud countermeasures to prevent a user from activating the indicator before the footwear has been used a minimum amount. For example, some embodiments of the invention may prevent a pedometer from registering more than a threshold distance within a preset period of time. Of course, various embodiments of the invention may alternately or additionally employ indicators that do not employ actively measuring instruments. For example, footwear according to various embodiments of the invention may have soles formed of multicolored layers of material. If the user had worn through a layer of material having one color to another layer of material having another color, this color change may server as an indicator that the footwear is due for replacement.

In step 217, the subscription center 103 receives the replacement request 115. Then, in step 219, the subscription center 103 submits an order 117 for replacement footwear to the footwear source 105. In response to receiving the order 117 for replacement footwear in step 219, the footwear source 105 provides another set of footwear 119 having the desired performance characteristics to the user 101. In this manner, the user 101 obtains another set of footwear having the performance characteristics desired by the user 101.

The process of submitting a replacement request 115 and obtaining in return a replacement set of footwear 119 can be repeated as often as desired according to various embodiments of the invention. For example, with some embodiments of the invention, a user 101 may pay a fixed initial subscription fee, and subsequently obtained replacement footwear for life. With still other embodiments of the invention, a user may pay a fixed initial subscription fee, and subsequently obtained only a preset number of sets of replacement footwear. With still other embodiments of the invention, a user may pay an initial subscription fee and periodically obtain replacement footwear, but only at predetermined intervals (such as, for example, every six months).

Figure 3:
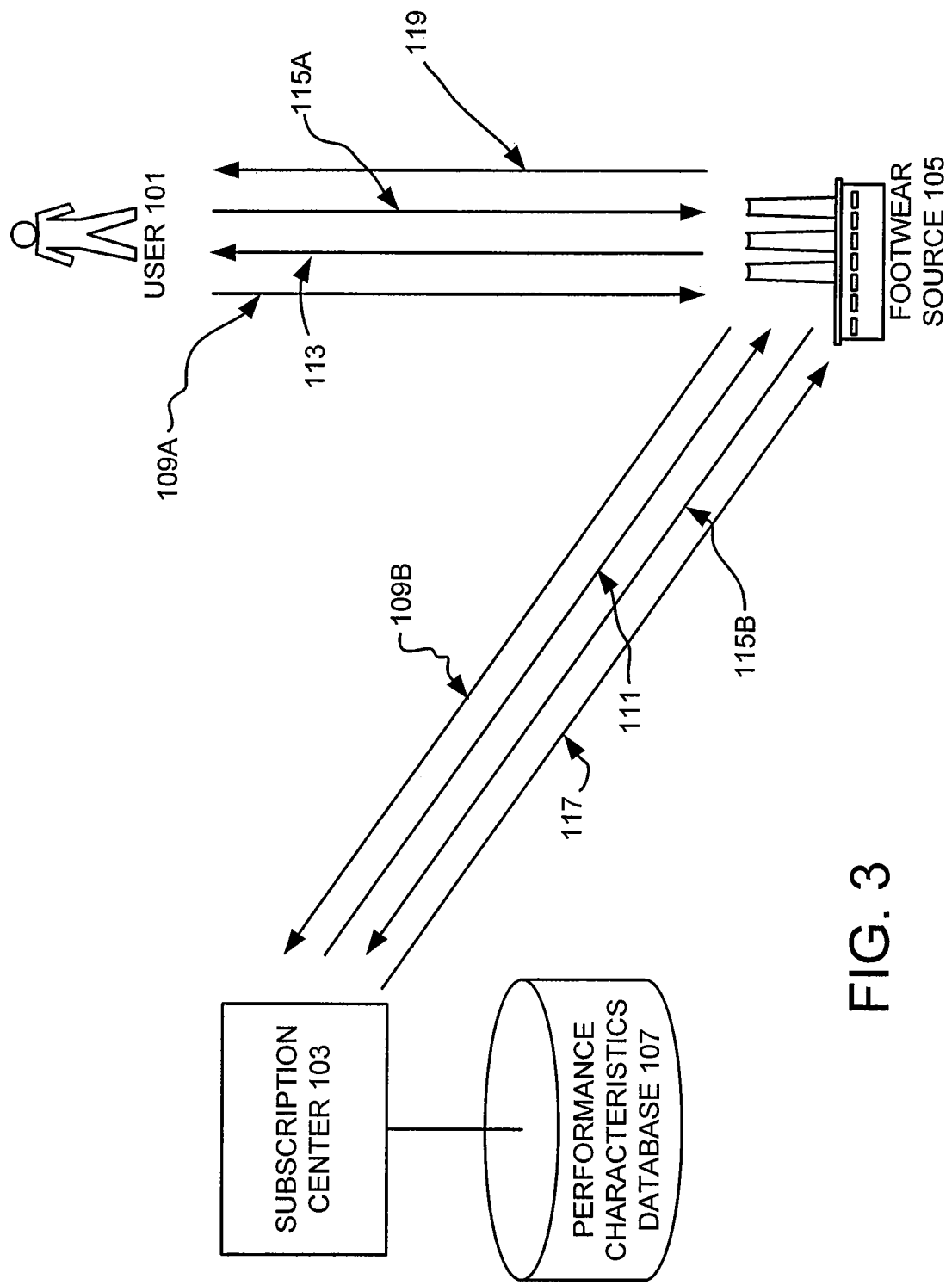
FIG. 3 shows another system for purveying footwear to a user according to still other embodiments of the invention.

FIG. 3 illustrates yet another system for purveying footwear to a user according to various embodiments of the invention. With this system, the user initially sends the subscription request 109A to the footwear source 105, rather than to the subscription center 103. The footwear source 105 then relays a corresponding subscription request 109B to the subscription center 103. In response, the subscription center 103 sends the footwear source 105 an order 111 to supply the requested footwear having the specified performance characteristics. Next, the footwear source 105 provides the footwear 113 to the user 101. When the user seeks a replacement for the footwear, the user may submit a replacement request 115A to the subscription center 103. If the subscription center 103 approves the replacement request 115A, it forwards an order 117 to the footwear source 105, instructing the footwear source to provide the specified footwear 119 to the user 101.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method comprising:
   programming an instrument to measure an amount of footwear use;
   providing, via web server, an interface configured to process footwear subscription requests;
   processing a footwear subscription request received at the interface to establish a footwear subscription wherein the footwear subscription request indicates one or more specified footwear performance characteristics and wherein the footwear subscription indicates a required amount of use that must occur before receiving replacement footwear;
   configuring footwear comprising the one or more specified footwear performance characteristics and comprising an indicator used to alert a user of the footwear that the instrument, directly or indirectly connected to the indicator, has measured the required amount of use of the footwear subscription, the indicator comprising an electronic light that is activated in response to measurement of the required amount of use by the instrument;
   determining, based on activation of the indicator, that the instrument has measured the required amount of use; and
   providing, in response to notification that the instrument has measured the required amount of use, replacement footwear comprising at least one of the one or more specified footwear performance characteristics.

2. The method of claim 1 wherein the one or more specified footwear performance characteristics include at least one of a footwear traction characteristic, a footwear flexibility characteristic, a footwear stability characteristic, a footwear cushioning characteristic, a footwear size characteristic, or combinations thereof.

3. The method of claim 1 wherein the instrument comprises at least one of a Global Positioning System (GPS) device, a local positioning device, a pedometer, an accelerometer, or a pressure switch.

4. The method of claim 1 wherein the instrument is configured to measure no more than a threshold amount of use within a predetermined time period.

5. A method comprising:
   programming an instrument to measure an amount of footwear use;
   providing, via a web server, an interface configured to process footwear subscription requests and footwear replacement requests;
   processing a footwear subscription request received at the interface to establish a footwear subscription wherein the footwear subscription request indicates one or more specified footwear performance characteristics and wherein the footwear subscription indicates a required amount of use that must occur before receiving replacement footwear;
   configuring footwear comprising the one or more specified footwear performance characteristics and comprising an indicator used to alert a user of the footwear that the instrument, directly or indirectly connected to the indicator, has measured the required amount of use of the footwear subscription, the indicator comprising an electronic light that is activated in response to measurement of the required amount of use by the instrument;
   processing a footwear replacement request received at the interface that identifies one or more new footwear performance characteristics;
   determining, based on activation of the indicator, that the instrument has measured the required amount of use; and
   providing, in response to notification that the instrument has measured the required amount of use, replacement footwear comprising the one or more new footwear performance characteristics.

6. The method of claim 5 wherein footwear performance characteristics include at least one of a footwear traction characteristic, a footwear flexibility characteristic, a footwear stability characteristic, a footwear cushioning characteristic, a footwear size characteristic, or combinations thereof.

7. The method of claim 5 wherein the instrument comprises at least one of a Global Positioning System (GPS) device, a local positioning device, a pedometer, an accelerometer, or a pressure switch.

8. The method of claim 5 wherein the instrument is configured to measure no more than a threshold amount of use within a predetermined time period.

9. A system comprising:
   a web server configured to provide an interface configured to process footwear subscription requests and footwear replacement requests;
   a database configured to store first records corresponding to footwear subscriptions and, for each one of the first records, a second record identifying a set of one or more footwear performance characteristics; and
   a computing device configured to:
     process a footwear subscription request received at the interface to establish a footwear subscription wherein the footwear subscription indicates a required amount of use that must occur before receiving replacement footwear,
     initiate provisioning, to an individual associated with the footwear subscription, of footwear comprising one or more specified footwear performance characteristics and comprising an indicator used to alert a user of the footwear that an instrument, directly or indirectly connected to the indicator, has measured the required amount of use of the footwear subscription, the indicator comprising an electronic light that is activated in response to measurement of the required amount of use by the instrument,
     process a footwear replacement request received at the interface that identifies the footwear subscription and one or more new footwear performance characteristics,
     determine, based on activation of the indicator, that the instrument has measured the required amount of use, and
     initiate, in response to notification that the instrument has measured the required amount of use, provisioning, to the individual, of replacement footwear comprising the one or more new performance characteristics.

10. The system of claim 9 wherein footwear performance characteristics include at least one of a footwear traction characteristic, a footwear flexibility characteristic, a footwear stability characteristic, a footwear cushioning characteristic, a footwear size characteristic, or combinations thereof.

11. The system of claim 9 wherein the instrument comprises at least one of a Global Positioning System (GPS) device, a local positioning device, a pedometer, an accelerometer, or a pressure switch.

12. The system of claim 9 wherein the instrument is configured to measure no more than a threshold amount of use within a predetermined time period.

* * * * *